United States Patent
Bohres et al.

(10) Patent No.: US 7,811,958 B2
(45) Date of Patent: Oct. 12, 2010

(54) METHOD FOR PRODUCING AN DMC CATALYST

(75) Inventors: Edward Bohres, Mannheim (DE);
Michael Triller, Mannheim (DE);
Raimund Ruppel, Dresden (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 11/908,145

(22) PCT Filed: Mar. 7, 2006

(86) PCT No.: PCT/EP2006/060517

§ 371 (c)(1),
(2), (4) Date: Sep. 10, 2007

(87) PCT Pub. No.: WO2006/094979

PCT Pub. Date: Sep. 14, 2006

(65) Prior Publication Data

US 2008/0167502 A1    Jul. 10, 2008

(30) Foreign Application Priority Data

Mar. 10, 2005  (DE) .................. 10 2005 011 581

(51) Int. Cl.
*B01J 27/26* (2006.01)

(52) U.S. Cl. ..................................... 502/175; 502/200
(58) Field of Classification Search ................. 568/622; 556/118; 502/175, 200
See application file for complete search history.

(56) References Cited

U.S. PATENT DOCUMENTS

| | | | |
|---|---|---|---|
| 4,472,560 | A | 9/1984 | Kuyper et al. |
| 4,477,589 | A | 10/1984 | Van der Hulst et al. |
| 6,063,897 | A | 5/2000 | Le-Khac et al. |
| 2002/0032121 | A1 | 3/2002 | Grosch et al. |

FOREIGN PATENT DOCUMENTS

| | | |
|---|---|---|
| EP | 0 862 997 | 9/1998 |
| GB | 1 008 319 | 10/1965 |
| WO | 99 56874 | 11/1999 |
| WO | 01 03831 | 1/2001 |
| WO | 03 080239 | 10/2003 |
| WO | 03 080240 | 10/2003 |
| WO | 03 080241 | 10/2003 |

*Primary Examiner*—Sikarl A Witherspoon
(74) *Attorney, Agent, or Firm*—Oblon, Spivak, McClelland, Maier & Neustadt, L.L.P.

(57) ABSTRACT

The invention relates to a process for preparing DMC catalysts by reacting cyanometalate compounds, preferably cyanometalate salts, in particular alkali metal or alkaline earth metal salts, with metal salts, wherein the reaction is carried out in the presence of a Brönsted acid.

16 Claims, No Drawings

METHOD FOR PRODUCING AN DMC CATALYST

The invention relates to a process for preparing multimetalcyanide compounds, also referred to as DMC catalysts.

DMC catalysts are used in the preparation of polyether alcohols by addition of alkylene oxides onto H-functional starter substances, in particular alcohols. The space-time yield in the preparation can be increased when DMC catalysts are used. The polyether alcohols prepared by this process have a reduced content of unsaturated constituents.

DMC catalysts are usually prepared by reacting a hexacyanometalate compound, preferably hexacyanocobaltate or hexacyanocobaltic acid, with a metal salt. The use of hexacyanometalic acids in the reaction mixture is described, for example, in EP 862 997, WO 03/080239, WO 03/080240 and WO 03/080241.

The preparation of hexacyanometalic acids is usually carried out by means of ion exchangers, as described in EP 862 997.

In WO 03/080239, WO 03/080240 and WO 03/080241, the preparation of DMCs is carried out via another route.

Here, a hexacyanometalate salt is dissolved in water and acidified with sulfuric acid. An organic solvent, for example methanol, is added to this solution, leading to precipitation of potassium sulfate. This is filtered off and the solution of the hexacyanometalic acid obtained in this way is combined with an aqueous solution of the metal salt component to convert it into the DMC catalyst. In this reaction, ligands and/or organic additives can be present or can be added.

This process, hereinafter also referred to as "salt metathesis", represents an alternative to the preparation of hexacyanometalic acid by ion exchange. The removal of potassium sulfate by filtration is, like ion exchange, an additional process step which in this case is also associated with the handling of a solid, which is generally associated with process engineering difficulties. In addition, it is necessary to use an organic solvent for the precipitation, which incurs additional costs. Furthermore, it cannot be ruled out that at least part of the salt formed remains in the catalyst.

WO 99/56874 describes a catalyst which is treated with a protic acid. The addition of the acid is carried out during or after the catalyst synthesis, but in any case only after precipitation of the DMC compound from metal salt and cyanometalate component. Polyetherols having a reduced proportion of high molecular weight material can be prepared using these catalysts.

U.S. Pat. No. 4,477,489 described DMC catalysts containing a mineral acid, in particular a hydrohalic acid, in built-in form. For this purpose, the precipitated DMC compounds are treated with a mineral acid which is built into the catalyst. The incorporation of the acid is said to improve the viscosity of the suspension of the DMC catalyst. In addition, any hydroxyl groups present in the catalyst after the precipitation are said to be reacted as a result.

The processes described require an additional process step involving treatment of the precipitated DMC compound with a mineral acid. When the acid remains, as described in U.S. Pat. No. 4,477,589, in the DMC catalyst, corrosion problems can occur, for example in the case of hydrochloric acid which is described as preferred in U.S. Pat. No. 4,477,589. The reactors for the polyol preparation therefore have to be made corrosion-resistant, which leads to higher costs. Furthermore, it cannot be ruled out that the acid which is only absorbed on the DMC catalyst and is thus relatively volatile will get into the product prepared by means of the DMC catalyst. In the case of chlorine-comprising acids, this could be problematical because of the possible formation of chloroorganic compounds. For example, it cannot be ruled out that hydrochloric acid will catalyze ether cleavage and thus an undesirable reaction in which chloroorganic compounds could in turn be formed.

It was an object of the present invention to find a simplified process for preparing DMC catalysts which leads to DMC catalysts having a high catalytic activity.

It has surprisingly been found that DMC catalysts having a high catalytic activity can be obtained when the reaction of the cyanometalate compound with the metal salt is carried out in the presence of a Brönsted acid.

The invention accordingly provides a process for preparing DMC catalysts by reacting cyanometalate compounds, preferably cyanometalate salts, in particular alkali metal or alkaline earth metal salts, with metal salts, wherein the reaction is carried out in the presence of a Brönsted acid.

The invention further provides the DMC catalysts prepared by the process of the invention.

The metal salt and the cyanometalate compound are reacted with one another in the form of the solutions, in particular as aqueous solutions.

The invention further provides a process for preparing polyether alcohols by addition of alkylene oxides onto H-functional starter substances using the DMC catalysts prepared by the process of the invention.

As Brönsted acids, it is in principle possible to use all water-soluble mineral and carboxylic acids which are stable at room temperature. Among carboxylic acids, which may comprise one or more carboxyl groups and up to 20 carbon atoms, carboxylic acids substituted by electronegative elements, for example chloroacetic acids, fluoroacetic acids or halogenated benzoic acids, are preferred. However, particular preference is given to using mineral acids. These are preferably selected from the group consisting of sulfuric acid, hydrochloric acid, sulfurous acid, alkylsulfonic, arylsulfonic and halosulfonic acids $HSO_3X$, where X is halogen, alkyl having from 1 to 20 carbon atoms, aryl, preferably phenyl or naphthyl, disulfuric acid, hydrochloric acid, chloric acid, perchloric acid, hydrobromic acid, hydroiodic acid, hydrofluoric acid, hydrogen sulfide, phosphoric acid, phosphorous acid, hydrophosphorous acid, tetrafluoroboric acid, hexafluorophosphoric acid, nitric acid, nitrous acid. Particular preference is given to sulfuric acid, alkylsulfonic, arylsulfonic and halosulfonic acids, hydrochloric acid, perchloric acid, hydrobromic acid, hydroiodic acid, hydrofluoric acid, phosphoric acid, nitric acid, very particularly preferably sulfuric acid and hydrochloric acid.

The acid is preferably added in such an amount that the pH after DMC precipitation is complete is from 3 to 6, preferably from 4 to 6.

The acid can be added to at least one of the starting compounds or both or be introduced into the reaction vessel as a separate stream. The acid is preferably added to the hexacyanometalate compound. It is important that the acid is present right at the beginning of the reaction, i.e. when the solution of the metal salt is combined with the solution of the cyanometalate compound.

The multimetalcyanide compounds of the invention are prepared in the customary way, with, as indicated, the reaction being carried out in the presence of a Brönsted acid.

For this purpose, an aqueous solution of a cyanometalate compound, in particular a cyanometalate salt, is combined with the aqueous solution of a metal salt. This is usually carried out using a stoichiometric excess of the metal salt. It is preferably carried out using a molar ratio of the metal ion to the cyanometalate component of from 1.1 to 7.0, more preferably from 1.2 to 5.0 and particularly preferably from 1.3 to 3.0. It is advantageous to place the cyanometalate solution together with the Brönsted acid in a reaction vessel and add the metal salt solution, but the converse procedure can also be employed. Good mixing, for example by stirring, is necessary during and after the combination of the starting solutions.

The content of the cyanometalate compound in the aqueous solution is from 0.1 to 30% by weight, preferably from 0.1 to 20% by weight, in particular from 0.2 to 10% by weight, based on the mass of aqueous solution. The content of the metal salt component in the metal salt solution is from 0.1 to 50% by weight, preferably from 0.2 to 40% by weight, in particular from 0.5 to 30% by weight, based on the mass of metal salt solution.

In an embodiment of the process of the invention, at least one of the aqueous solutions of the starting materials comprises a heteroatom-comprising ligand as is designated and explained as L in the general formula (I). The heteroatom-comprising ligands can also be added to the suspension formed by combining the two starting solutions, with good mixing having to be ensured here, too.

The content of the heteroatom-comprising ligands, if such compounds are used, in the suspension formed after the precipitation should be from 1 to 60% by weight, preferably from 5 to 40% by weight, in particular from 10 to 30% by weight.

To set the morphology of the multimetalcyanide compounds, it has been found to be useful to carry out the preparation of these compounds in the presence of surface-active substances. The surface-active substances are generally initially charged in at least one of the two solutions or, preferably, are added during and/or immediately after the precipitation. The content of surface-active substances in the precipitation solution is preferably from 0.01 to 40% by weight, in particular from 0.05 to 30% by weight, based on the total mass of the precipitation suspension. A further preferred embodiment provides for the surface-active substances to be distributed proportionally over both starting solutions.

In a further preferred embodiment of the preparation of multimetalcyanide compounds as described in WO 01/64772, the reaction of the metal salt with the cyanometalate compound is carried out in two stages. Here, a catalytically inactive, in particular cubic, phase of the multimetalcyanide compound is prepared first and this is subsequently converted by recrystallization into a catalytically active phase of the multimetalcyanide compound. The recrystallization can be carried out in various ways. Thus, it is possible to add further starting solutions, in particular the solution of the metal salt, to the suspension formed after the reaction. A further possibility is to alter the temperature of the precipitation suspension after the precipitation is complete, in particular to heat the suspension. A further possibility is to add further heteroatom-comprising ligands and/or surface-active substances to the precipitation suspension after the precipitation is complete.

In a particularly preferred embodiment of the process of the invention, a multimetalcyanide compound, in particular a crystalline multimetalcyanide compound, is firstly prepared, for example as described in WO 99/16775. This can then be transformed into the multimetalcyanide compound according to the invention in a further step, for example by means of a heat treatment, preferably in the presence of an inert gas.

To carry out the heat treatment, the multimetalcyanide compound can be separated off from the precipitation suspension and dried. In an embodiment of the process, the multimetalcyanide compound can also be subjected to the heat treatment in the precipitation suspension. In a further embodiment of the process, the multimetalcyanide compound prepared by conventional methods can be added to the starting substance used for preparing the polyether alcohols and this mixture can be subjected to the heat treatment, if appropriate under reduced pressure and/or with an inert gas being passed through the mixture.

The heat treatment is preferably carried out at a temperature in the range from 90 to 200° C., in particular from 100 to 160° C.

After the precipitation, the precipitated multimetalcyanide compound is separated off from the precipitation suspension. This can be effected by centrifugation or preferably by filtration. The precipitate which has been separated off is washed one or more times, preferably with water. Organic ligand and/or a surface-active compound can also be added to the washing water.

The multimetalcyanide catalysts prepared by the process of the invention have the general formula:

$$M^1_a[M^2(CN)_b(A)_c]_d \cdot fM^1_gX_n \cdot h(H_2O)eL \cdot kP \qquad (I)$$

where $M^1$ is a metal ion selected from the group consisting of $Zn^{2+}$, $Fe^{2+}$, $Fe^{3+}$, $Co^{2+}$, $Co^{3+}$, $Ni^{2+}$, $Mn^{2+}$, $Sn^{2+}$, $Sn^{4+}$, $Pb^{2+}$, $Mo^{4+}$, $Mo^{6+}$, $Al^{3+}$, $V^{4+}$, $V^{5+}$, $Sr^{2+}$, $W^{4+}$, $W^{6+}$, $Cr^{2+}$, $Cr^{3+}$, $Cd^{2+}$, $Cu^{2+}$ $La^{3+}$, $Ce^{3+}$, $Ce^{4+}$, $Eu^{3+}$, $Mg^{2+}$, $Ti^{3+}$, $Ti^{4+}$, $Ag^+$, $Rh^{2+}$, $Ru^{2+}$, $Ru^{3+}$, $Pd^{2+}$, preferably $Zn^{2+}$, $Fe^{2+}$, $Fe^{3+}$, $Co^{2+}$, $Co^{3+}$, $M^2$ is a metal ion selected from the group consisting of $Fe^{2+}$, $Fe^{3+}$, $Co^{2+}$, $Co^{3+}$, $Mn^{2+}$, $Mn^{3+}$, $Ni^{2+}$ $V^{4+}$, $V^{5+}$, $Cr^{2+}$, $Cr^{3+}$, $Rh^{3+}$, $Ru^{2+}$, $Ir^{3+}$, preferably $Fe^{2+}$, $Fe^{3+}$, $Co^{2+}$, $Co^{3+}$ and $Ir^{3+}$ and $M^1$ and $M^2$ are different, A is an anion selected from the group consisting of halide, hydroxide, sulfate, hydrogensulfate, carbonate, hydrogencarbonate, cyanide, thiocyanate, isocyanate, cyanate, carboxylate, oxalate, nitrate, nitrosyl, phosphate, hydrogenphosphate and dihydrogenphosphate X is an anion selected from the group consisting of halide, hydroxide, sulfate, hydrogensulfate, carbonate, hydrogencarbonate, cyanide, thiocyanate, isocyanate, cyanate, carboxylate, oxalate, nitrate and nitrite ($NO_2$—), L is a water-miscible ligand selected from the group consisting of alcohols, aldehydes, ketones, ethers, polyethers, esters, polyesters, polycarbonate, ureas, amides, nitriles, sulfides and mixtures thereof, P is an organic additive selected from the group consisting of polyethers, polyesters, polycarbonates, polyalkylene glycol sorbitan esters, polyalkylene glycol glycidyl ethers, polyacrylamide, poly(acrylamide-co-acrylic acid), polyacrylic acid, poly(acrylamide-co-maleic acid), polyacrylonitrile, polyalkyl acrylates, polyalkyl methacrylates, polyvinyl methyl ether, polyvinyl ethyl ether, polyvinyl acetate, polyvinyl alcohol, poly-N-vinylpyrrolidone, poly(N-vinylpyrrolidone-co-acrylic acid), polyvinyl methyl ketone, poly(4-vinylphenol), poly(acrylic acid-co-styrene), oxazoline polymers, polyalkylenimines, maleic acid and maleic anhydride copolymers, hydroxyethylcellulose, polyacetates, ionic surface-active and interface-active compounds, bile acids and salts, esters and amides thereof, carboxylic esters of polyhydric alcohols and glycosides, and a, b, d, g and n are integers or fractions greater than zero, c, f, e, h and k are integers or fractions greater than or equal to zero, where a, b, c and d and also g and n are selected so that the compound is electrically neutral.

The DMC catalysts are, as described, preferably prepared by reacting metal salts of the general formula $M^1{}_aX_n$ with cyanometalate compounds of the general formula $M^3{}_a[M^2(CN)_b(A)_c]_d$, where $M^3$ is an alkali metal or alkaline earth metal and the remaining symbols are as defined above.

The catalysts prepared by the process of the invention can be crystalline or amorphous. When k is zero, crystalline double metal cyanide compounds are preferred. When k is greater than zero, crystalline, partially crystalline and also substantially amorphous catalysts are preferred.

There are various preferred embodiments of the DMC catalysts prepared by the process of the invention.

One preferred embodiment comprises catalysts of the formula (I) in which k is greater than zero.

The preferred catalyst then comprises:

a) at least one multimetalcyanide compound b) at least one organic ligand c) at least one organic additive P.

In another preferred embodiment, k is zero, e is also optionally zero and X is exclusively carboxylate, preferably formate, acetate and propionate. Such DMC catalysts are described, for example, in WO 99/16775. In this embodiment, crystalline double metal cyanide catalysts are preferred.

In another preferred embodiment of the catalysts, f, e and k are not zero. In this case, the DMC catalysts are compounds comprising a water-miscible organic ligand, usually in an amount of from 0.5 to 30% by weight, and an organic additive, usually in an amount of from 5 to 80% by weight, as described in WO 98/06312. The catalysts can be prepared with stirring, as described in U.S. Pat. No. 5,158,922, preferably with intensive stirring, for example at 24 000 rpm by means of a Turrax.

Catalysts which are likewise suitable are described in the patent application WO 01/03830. Such DMC catalysts are prepared using organic sulfones of the general formula R—S(O)$_2$—R or sulfoxides of the general formula R—S(O)—R as organic complexing agent. Advantages of the catalyst are short induction times and moderate evolution of heat in the addition reaction of the alkylene oxides. WO 01/03831 describes a further variant of the catalyst synthesis. Here, DMC catalysts are synthesized by an "Incipient Wetness Method". These catalysts can likewise be prepared by the process of the invention.

The preparation of polyether alcohols using the DMC catalysts prepared by the process of the invention is carried out, as indicated, by addition of alkylene oxides onto H-functional starter substances in the presence of the catalysts described.

As alkylene oxides, it is possible to use all known alkylene oxides, for example ethylene oxide, propylene oxide, butylene oxide, styrene oxide. In particular, ethylene oxide, propylene oxide and mixtures of the compounds mentioned are used as alkylene oxides.

Starter substances used are H-functional compounds. In particular, alcohols having a functionality of from 1 to 8, preferably from 2 to 8, are used. To prepare polyether alcohols which are used for flexible polyurethane foams, starter substances employed are, in particular, alcohols having a functionality of from 2 to 6, in particular 2 and 3. Examples are ethylene glycol, propylene glycol, glycerol, trimethylolpropane, pentaerythritol, sorbitol. In the addition reaction of the alkylene oxides by means of DMC catalysts, it is advantageous to use reaction products of the alcohols mentioned with alkylene oxides, in particular propylene oxide, together with or in place of the alcohols mentioned. Such compounds preferably have a molar mass of up to 1000 g/mol. The addition reaction of the alkylene oxides in the preparation of these reaction products can be carried out using any catalysts, for example using basic catalysts. The polyether alcohols for the production of flexible polyurethane foams usually have a hydroxyl number in the range from 20 to 100 mg KOH/g.

In general, all of the starter substance is initially charged and the alkylene oxide is metered in after activation.

In a particular embodiment of the preparation of polyether alcohols, only part of the starter substance is placed in the reaction vessel at the beginning and the reaction is started by addition of alkylene oxide. Further starting substance and alkylene oxide are metered in at least during part of the reaction. This procedure is described, for example, in EP 879 259. This way of carrying out the process enables the formation of very high molecular weight components in the polyether alcohol to be suppressed.

To prepare surface-active compounds, bifunctional alcohols are particularly preferably used as starter substances. To prepare carrier oils, monofunctional alcohols having from 5 to 20 carbon atoms in the main chain are used as starter substances.

The addition reaction of the alkylene oxides in the preparation of the polyether alcohols used for the process of the invention can be carried out by known methods. Thus, it is possible for the polyether alcohols to comprise only one alkylene oxide. When a plurality of alkylene oxides is used, blockwise addition in which the alkylene oxides are added on individually in succession or random addition in which the alkylene oxides are introduced together is possible. It is also possible to build both blockwise sections and random sections into the polyether chain during preparation. To prepare surface-active compounds and carrier oils, the alkylene oxides are usually added on blockwise.

To produce flexible polyurethane slabstock foams, preference is given to using polyether alcohols having a high content of secondary hydroxyl groups and a content of ethylene oxide units in the polyether chain of not more than 30% by weight, based on the weight of the polyether alcohol. These polyether alcohols preferably have a propylene oxide block at the end of the chain. For producing molded flexible polyurethane foams, use is made of, in particular, polyether alcohols having a high content of primary hydroxyl groups and an ethylene oxide end block in an amount of <20% by weight, based on the weight of the polyether alcohol. In the case of polyetherols prepared exclusively by means of a DMC catalysis for molded flexible foams, the alkoxylation method described in WO 01/44347 and the polyetherols resulting therefrom can also be used.

The addition reaction of the alkylene oxides is carried out under the usual conditions, at temperatures in the range from 60 to 180° C., preferably from 90 to 140° C., in particular from 100 to 130° C., and pressures in the range from 0 to 20 bar, preferably in the range from 0 to 10 bar and in particular in the range from 0 to 5 bar. The mixture of starting substance and DMC catalyst can be pretreated by stripping before commencement of the alkoxylation in accordance with the teachings of WO 98/52689.

After the addition reaction of the alkylene oxides is complete, the polyether alcohol is worked up by customary methods, by removing the unreacted alkylene oxides and volatile constituents, usually by distillation, steam stripping or gas stripping and/or other methods of deodorization. If necessary, filtration can also be carried out.

The polyether alcohols prepared in this way can be used, for example, for producing polyurethanes, as surfactants or as carrier oils.

The use of the DMC catalysts of the invention surprisingly makes it possible to prepare polyether alcohols which have very good properties. The narrow molar mass distribution results in a low product viscosity and a low content of high molecular weight constituents. Furthermore, the induction time at the beginning of the alkoxylation reaction is significantly reduced, and the reaction proceeds at lower total pressures and lower concentrations of free alkylene oxide.

Compared to the processes described in the prior art for preparing DMC catalysts, in which a hexocyanometalic acid is firstly prepared in a separate step, a process step is saved. The catalytic activity is comparable with or better than DMC catalysts which have been obtained from the reaction of $H_3[Co(CN)_6]$, prepared by ion exchange or salt metathesis, with metal salt, hereinafter referred to as conventional DMC catalysts. The DMC catalysts prepared by the process of the invention lead, in the reaction of starter alcohols with alkylene oxides, to polyether alcohols having excellent quality, e.g. low viscosity, narrow molar mass distribution and a low content of high molecular weight components, which is comparable to or better than polyols which have been synthesized using conventional DMC catalysts. At the same time, the new, improved DMC catalysts comprise no acid as constituent.

The invention is illustrated by the following examples.

Catalyst Preparation

EXAMPLE 1

1000 g of an aqueous $K_3[Co(CN)_6]$ solution (0.9% by weight of Co) were placed in a 2 l stirred vessel. The temperature was set to 25° C. A pH of 1.1 was set by means of 5M sulfuric acid. At a stirrer power of 1 W/l, 580 g of zinc acetate solution (2.6% by weight of Zn) were metered in over a period of 45 minutes. The stirrer power was reduced to 0.4 W/l. 100 g of Pluronic® PE 6200 from BASF AG were added and the solution was heated to 55° C. 200 g of zinc acetate solution (2.6% of Zn) were added over a period of 10 minutes. The pH after the addition was 4.8. The after-reaction time was selected so that the total duration of the experiment is 200 minutes. The catalyst was filtered off and subsequently resuspended twice in 1 l of water. After final filtration, the catalyst was dried at 60° C. for 16 hours.

EXAMPLE 2

The procedure of example 1 was repeated using 40 g of Pluronic® PE 6200 in place of 100 g of Pluronic® PE 6200.

EXAMPLE 3

The procedure of example 1 was repeated using 40 g of Lutensol® AP20 from BASF AG in place of 100 g of Pluronic® PE 6200.

EXAMPLE 4 the procedure of example 1 was repeated using 40 g of Lutensol® AP8 from BASF AG in place of 100 g of Pluronic® PE 6200.

Testing of the Catalyst Activity

In a 250 ml stirring autoclave, 64 g of a glycerol propoxylate having a molar mass of about 900 g/mol (hereinafter referred to as VP900) together with the appropriate amount of DMC catalyst were finely dispersed for 5 minutes by means of an Ultraturrax apparatus. The reactor was subsequently closed and evacuated at 3 mbar at a temperature of 100° C. for two hours. 36 g of propylene oxide were subsequently fed in at 130° C. over a period of two minutes and the pressure and temperature curves were recorded. After the propylene oxide had reacted completely, which could be recognized from a drop in the pressure to a constant level, the reaction product was blanketed with nitrogen and degassed at 10 mbar and then drained from the autoclave at 100° C. and the yield was determined. The time to occurrence of the maximum determined in the recorded curves was taken as a measure of the activity.

| Catalyst from example | Concentration [ppm] | Induction time [min] | Max. temp. [° C.] | Max. pressure [bar] | Yield [g] |
| --- | --- | --- | --- | --- | --- |
| 4 | 100 | 1 | 231 | 9.4 | 97 |
| 4 | 50 | 1 | 239 | 9.5 | 97 |
| 4 | 25 | 2 | 194 | 8.5 | 96 |
| 3 | 50 | 2 | 237 | 9.5 | 97 |
| 3 | 25 | 8 | 156 | 7.7 | 96 |
| 2 | 50 | 2 | 246 | 10.4 | 96 |
| 2 | 25 | 2 | 206 | 9.6 | 97 |
| 1 | 50 | 2 | 243 | 10.4 | 97 |
| 1 | 25 | 3 | 185 | 8.6 | 96 |

EXAMPLE OF A POLYOLSYNTHESIS 2.5 kg of the abovementioned VP900 were placed in a 20 l stirring autoclave and admixed with the calculated amount of DMC catalyst (TK085) (100 ppm, based on the finished polyether alcohol) dispersed in VP900. After a dewatering phase at 130° C. under reduced pressure, 1.67 kg of a mixture of glycerol and DEG and also 15.84 kg of propylene oxide were metered in in parallel at such a rate that the pressure did not exceed 5 bar. The intermediate obtained in this way had an OHN of 151.5 mg KOH/g. 6.34 kg of this intermediate were reacted at 120° C. with a total of 13.67 kg of a mixture of propylene oxide and ethylene oxide in the same reactor without further addition of catalyst.

After a short after-reaction phase of about 15 minutes, volatile constituents were removed from the reaction mixture by distillation and the product was cooled and drained from the reactor. The colorless, clear liquid obtained had the following properties: OHN=49.0 mg KOH/g, acid number=0.034 mg KOH/g, viscosity (25° C.)=577 mPas, iodine number=0.04 g of $I_2$/100 g.

The invention claimed is:

1. A process for preparing a DMC catalyst, the processing comprising reacting, in an aqueous solution, a cyanometalate compound with a stoichiometric excess of a metal salt in the presence of a Brönsted acid, at least one water-miscible ligand, and at least one organic additive to form the DMC catalyst, wherein the molar ratio of metal salt to cyanometalate compound is from 1.1 to 7.0, and precipitating the DMC catalyst from the aqueous solution; wherein the aqueous solution has a pH, after the precipitating, in the range from 3 to 6, and wherein the precipitated DMC catalyst comprises the at least one water-miscible ligand and the at least one organic additive.

2. The process according to claim 1, wherein the Brönsted acid is selected from the group consisting of a water-soluble mineral acid that is stable at room temperature and a carboxylic acid that is stable at room temperature.

3. The process according to claim 1, wherein the Brönsted acid is a carboxylic acid, and wherein the carboxylic acid comprises one or more carboxyl groups and up to 20 carbon atoms in the molecule.

4. The process according to claim 1, wherein the Brönsted acid is a carboxylic acid substituted by electronegative elements.

5. The process according to claim 1, wherein the Brönsted acid is a mineral acid, and wherein the mineral acid is selected from the group consisting of sulfuric acid, hydrochloric acid, sulfurous acid, a halogensulfonic acid $HSO_3X$ wherein X is halogen, hydrochloric acid, chloric acid, perchloric acid, hydrobromic acid, hydroiodic acid, hydrofluoric acid, hydrogen sulfide, phosphoric acid, phosphorous acid, hypophosphorous acid, tetrafluoroboric acid, hexafluorophosphoric acid, nitric acid, and nitrous acid.

6. The process according to claim 5, wherein the mineral acid is selected from the group consisting of sulfuric acid, a halosufonic acid, hydrochloric acid, perchloric acid, hydrobromic acid, hydroiodic acid, hydrofluoric acid, phosphoric acid, nitric acid.

7. The process according to claim 5, wherein the mineral acid is selected from the group consisting of sulfuric acid and hydrochloric acid.

8. The process of claim 1, wherein the cyanometalate compound is a cyanometalate salt.

9. The process of claim 8, wherein the cyanometalate salt is a salt selected from the group consisting of an alkali metal salt and an alkaline earth metal salt.

10. The process of claim 9, wherein the cyanometalate salt is $K_3[Co(CN)_6]$.

11. The process of claim 1, wherein the at least one water-miscible ligand is selected from the group consisting of an alcohol, an aldehyde, a ketone, an ether, a polyether, an ester, a polyester, a polycarbonate, a urea, an amide, a nitrile, a sulfide, and mixtures thereof.

12. The process of claim 1, wherein the at least one organic additive is selected from the group consisting of a polyether, a polyester, a polycarbonate, a polyalkylene glycol sorbitan ester, a polyalkylene glycol glycidyl ether, a polyacrylamide, a poly(acrylamide-co-acrylic acid), a polyacrylic acid, a poly(acrylamide-co-maleic acid), a polyacrylonitrile, a polyalkyl acrylate, a polyalkyl methacrylate, a polyvinyl methyl ether, a polyvinyl ethyl ether, a polyvinyl acetate, a polyvinyl alcohol, a poly-N-vinylpyrrolidone, a poly(N-vinylpyrrolidone-co-acrylic acid), a polyvinyl methyl ketone, a poly(4-vinylphenol), a poly(acrylic acid-co-styrene), an oxazoline polymer, a polyalkylenimine, a maleic acid and maleic anhydride copolymer, hydroxyethylcellulose, a polyacetate, an ionic surface-active and interface-active compound, a bile acid, a salt of a bile acid, an ester of a bile acid, an amide of a bile acid, a carboxylic ester of a polyhydric alcohol, a glycoside and mixtures thereof.

13. A process for preparing a DMC catalyst, the processing consisting essentially of:
reacting, in an aqueous solution, a cyanometalate compound with a stoichiometric excess of a metal salt in the presence of a Brönsted acid, at least one water-miscible ligand, and at least one organic additive to form the DMC catalyst, wherein the molar ratio of metal salt to cyanometalate compound is from 1.1 to 7.0, and
precipitating the DMC catalyst from the aqueous solution;
wherein the aqueous solution has a pH, after the precipitating, in the range from 3 to 6, and
wherein the precipitated DMC catalyst comprises the at least one water-miscible ligand and the at least one organic additive.

14. The process of claim 1, wherein the molar ratio of metal salt to cyanometalate compound is from 1.2 to 7.0.

15. The process of claim 13, wherein the molar ratio of metal salt to cyanometalate compound is from 1.2 to 7.0.

16. The process of claim 1, wherein the molar ratio of metal salt to cyanometalate compound is from 1.3 to 7.0.

* * * * *